J. W. STEVENSON.
TRAP.
APPLICATION FILED APR. 19, 1920.

1,347,130.

Patented July 20, 1920.

2 SHEETS—SHEET 2.

J. W. Stevenson, Inventor

Witness

UNITED STATES PATENT OFFICE.

JOSEPH W. STEVENSON, OF BALTIMORE, MARYLAND.

TRAP.

1,347,130.

Specification of Letters Patent.

Patented July 20, 1920.

Application filed April 19, 1920. Serial No. 374,946.

*To all whom it may concern:*

Be it known that I, JOSEPH W. STEVENSON, a citizen of the United States, residing at Baltimore, in the State of Maryland, have invented a new and useful Trap, of which the following is a specification.

The device forming the subject matter of this application is a trap, adapted primarily but not exclusively to catch rats, mice, and other relatively small animals, although the device may be made in any desired size.

The invention aims to provide a structure of the sort above mentioned comprising separable parts, including an outer cage and an inner trapping mechanism, the construction being such that a plurality of cages may be left at different places, and be baited until the animals become accustomed to the device and lose their fear thereof, the trapping mechanism being placed in the cage at the appropriate time.

It is within the province of the disclosure to improve the means whereby an animal is entrapped or imprisoned.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
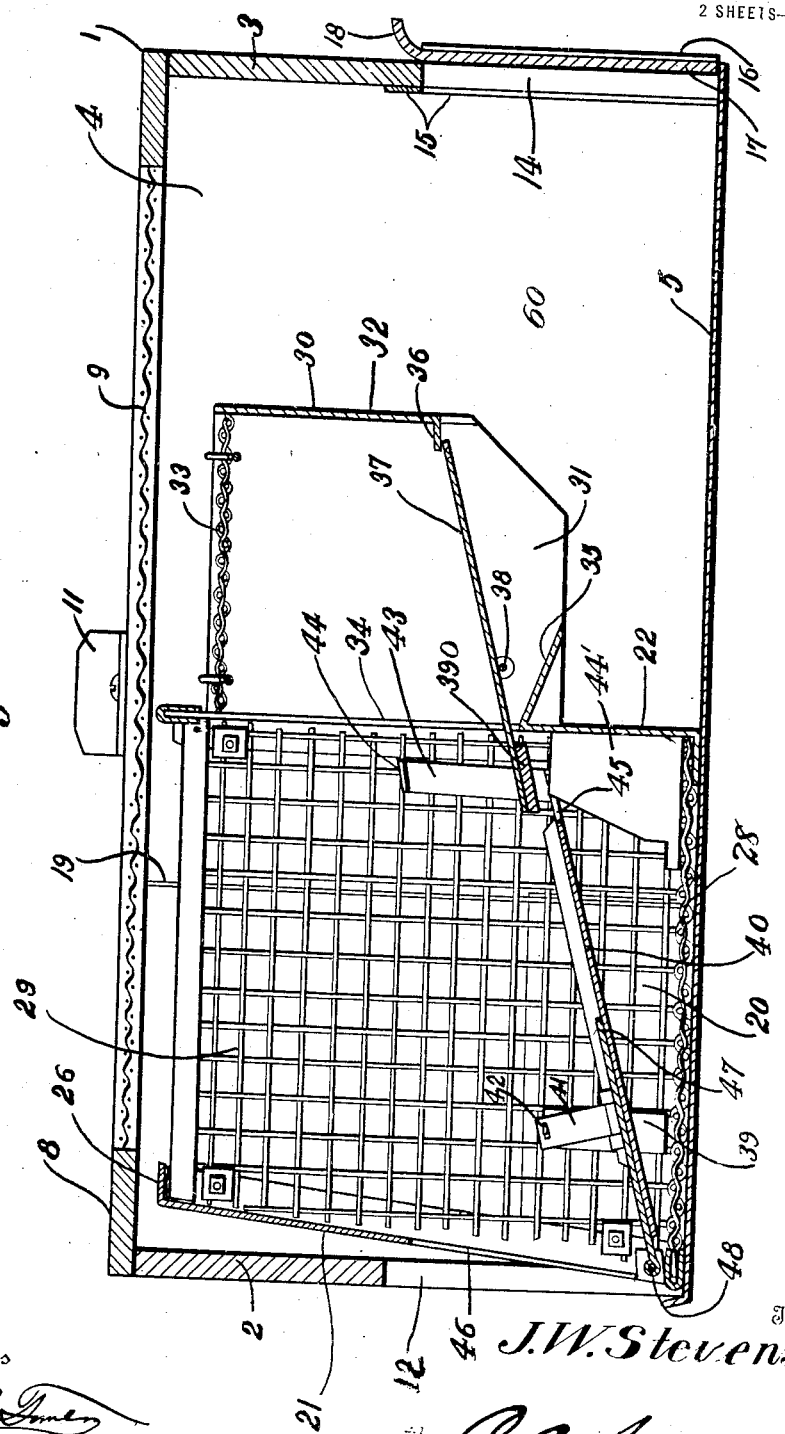
Figure 2:
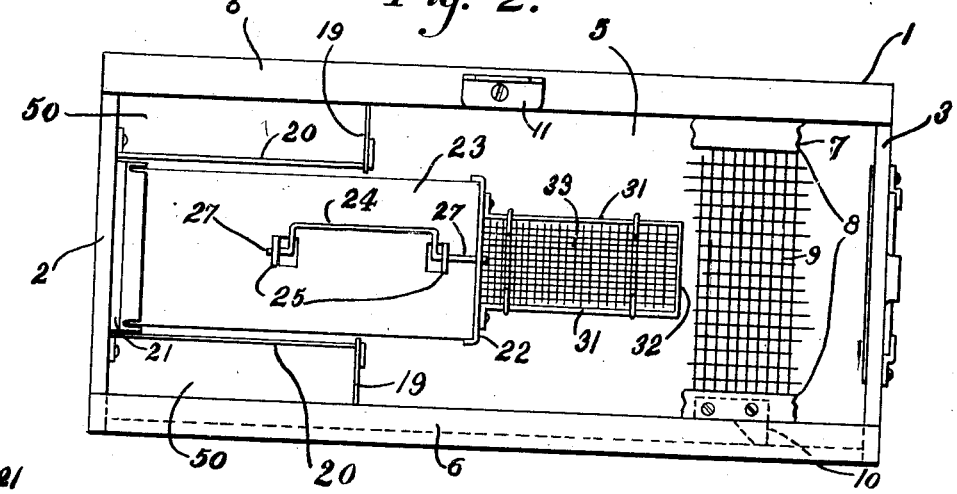
Figure 3:
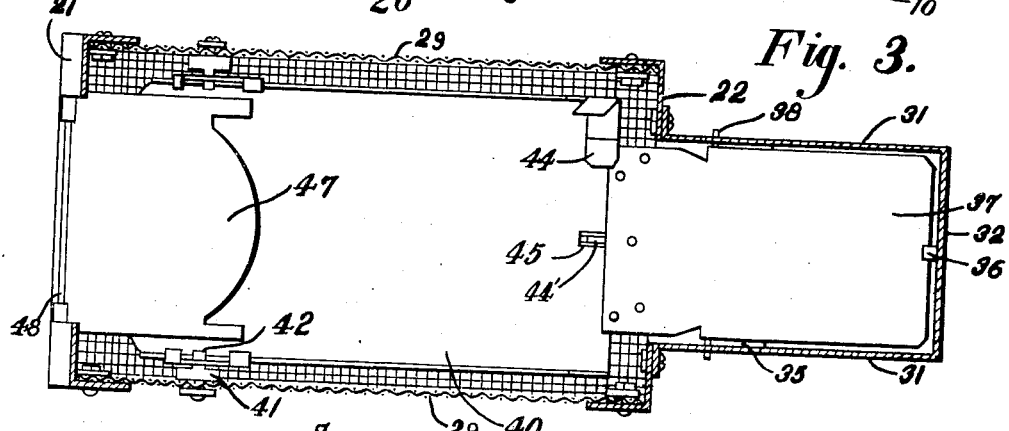
Figure 4:
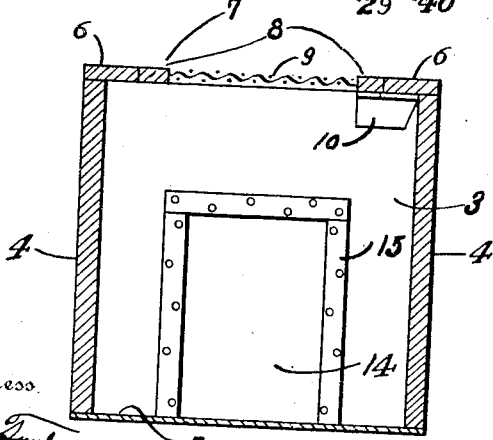

Figure 1 shows in longitudinal section, a device constructed in accordance with the invention, parts being broken away and parts appearing in section; Fig. 2 is a top plan wherein the lid is removed; Fig. 3 is a horizontal section taken through the trapping mechanism; and Fig. 4 is a cross section on the line 4—4 of Fig. 2.

The device forming the subject matter of this application includes a box-like cage 1, comprising a front end 2, a rear end 3, sides 4, and a bottom 5. Top strips 6 are supported at their extremities on the ends 2 and 3 and project inwardly from the sides 4. The numeral 7 denotes a lid adapted to fit between the top strips 6 and to be supported on the ends 2 and 3, the lid 7 including a frame 8 and a screen 9 within the frame. At one side, the frame 8 may be supplied with fingers 10 adapted to engage beneath one of the top strips 6, the other of the top strips carrying a button 11 adapted to overlap the frame 8. The frame 8 thus may be held securely but removably on the body portion of the cage 1. The front end 2 of the cage 1 is supplied with an entrance 12, an exit 14 being provided in the rear end 3, the exit being bounded by a reinforcing frame 15 secured to the inner surface of the end 3. On the outer surface of the end 3, at opposite sides of the exit 14, are located guides 16 in which a door 17 is mounted for vertical reciprocation, the door comprising a finger piece 18 whereby the door may be manipulated. Transverse walls 19 project inwardly from the sides 4, the walls extending from the top strips 2 to the bottom 5. Longitudinal walls 20 extend from the inner edges of the cross or transverse walls 19 to the front end 2 of the cage 1. Noting Fig. 1 of the drawings, it will be observed that the longitudinal walls 20 are of relatively small height and extend upwardly but a short distance from the bottom 5.

The invention includes, further, a trapping device including a box-like casing having an end wall 21 provided at its upper edge with a flange 26, the wall 21 being denominated the outer end wall. The casing includes an inner end wall 22, the walls 21 and 22 being connected by foraminous or net work sides 29. A top 23 is provided, the same having keepers 25 receiving the ends 27 of a bail-shaped handle 24. One end of the top 23 may be inserted beneath the flange 26 and the bail or handle 24 may be moved longitudinally, until one of its ends 27 engages in an opening in the inner end wall 22.

A compartment 30 projects from the wall 22 of the casing, the compartment including sides 31, an end 32 and a foraminous top 33. A doorway 34 in the wall 22 establishes communication between the casing and the compartment 30. At the lower edge of the doorway 34, the wall 22 is provided with a lip 35. A stop 36 projects inwardly from the end wall 32 of the casing. A platform 37 is located in the compartment 30 and projects into the casing. The platform 37 is tiltably supported intermediate its ends on a rod 38 extended between the sides 31 of the compartment. At one end of the platform 37 is located a weight 390 which elevates the other end of the platform until the same normally coöperates with the stop 36. When platform 37 swings to an open position, as hereinafter described, the opening movement of the platform is limited by contact between the platform and the lip 35.

Bearings 39 are mounted on the foraminous sides 29 of the casing. The numeral 40 denotes a platform having upstanding arms 41, pivoted at 42 to the bearings 39. A platform 40 is provided at its inner end with a standard 43 having a finger 44 which overhangs the inner end of the platform 37. A guide plate 44' is attached to the end wall 22 and moves in a slot 45 in the inner end of the platform 40 to steady the platform in its vertical swinging movement. The platform 40 is located above the foraminous bottom 28 of the casing and projects toward a doorway 46 in the wall 21. The doorway 46 is controlled by a door 47 pivotally supported at its lower end as shown at 48, on the end wall 21, so as to swing inwardly on top of the platform 40, as shown in Fig. 1.

In practical operation, a plurality of box-like cages 1 are provided, and the trapping mechanism, hereinbefore described is removed from each of the cages. The cages are then left in places where animals are wont to congregate, bait being placed in the bait receptacles 50 which are formed by the parts 19 and 20, as clearly shown in Fig. 2. The animals eat the bait and become accustomed to the sight of cage 1.

After a time, the device shown in Fig. 3 is mounted in the cage, between the longitudinal walls 20, the doorway 46 coinciding with the doorway 12. The inner sides of the bait receptacles 50 above the upper edges of the longitudinal walls 20 are closed by the sides 29 of the casing of the trapping mechanism. Since these walls are foraminous, the animal may see readily the bait in the bait receptacles 50. The parts being arranged as shown in Fig. 1, the animal enters the casing through the doorways 12 and 46 and treads on the platform 40. The platform 40 tilts on its pivotal mounting 42 and swings the door 47 upwardly into a closed position. The animal is now entrapped in the casing. The animal, having no exit save the doorway 34 passes through the said doorway into the compartment 30, the animal treading on the tiltable platform 37. The platform 37 dumps the animal into the chamber 60 in the cage 1 to the rear of the transverse walls 19, it being observed that these walls serve to prevent the animals in the chamber 60 from gaining access to the bait in the bait compartment 50. The platform 40 is so hung that when its lower end has been moved downwardly by the weight of the animal, the outer end will be elevated and will hold the door 47 in a closed position. When the inner end of the platform 37 moves downwardly, that end of the platform which projects into the casing coöperates with the guide 44 on the standard 43 and raises the inner end of the platform 40, the outer end of the platform 40 moving downwardly, thus setting the door 47 free, so that the said door can swing inwardly into the position shown in Fig. 2. The animals may be removed from the chamber 60 at any time. If desired, the door 17 may be opened, permitting the entrapped animals to pass from the chamber 60 into a larger receptacle, not shown, or a barrel of water or the like may be provided, beneath the exit 14, to receive the animals.

Having thus described the invention, what is claimed is:—

1. In a device of the class described, a box-like cage having transverse walls defining bait compartments, the cage having a doorway whereby an animal may enter the cage, have free access to the compartments and leave the cage; and a trapping mechanism comprising a doorway coöperating with the doorway of the cage, and means for preventing an animal from leaving the casing and the cage through the doorways, the casing being removably mounted between the walls and having foraminous sides rendering the bait compartments visible but preventing access thereto.

2. In a device of the class described, a box-like cage having transverse walls defining bait compartments at the sides of the cage and a chamber at one end of the cage, the other end of the cage having a doorway whereby an animal may enter the cage, have free access to the compartment and leave the cage; a trapping mechanism comprising a casing having a doorway coöperating with the doorway of the cage, and means for preventing an animal from leaving the casing and the cage through the doorways, the casing being removably mounted between the walls and having foraminous sides rendering the bait compartments visible but preventing access thereto; a compartment on the inner end of the casing and extending into the chamber; and a tilting platform constituting a closure for the last specified compartment, and giving access to the chamber, the transverse walls preventing an animal in the chamber from having access to the bait compartments.

3. In a device of the class described, a box-like casing having a doorway in one end; a door pivoted at its lower end to the casing and controlling the doorway; a first platform tiltably supported intermediate its ends in the casing, one end of the platform constituting means for closing the door when the other end of the platform is depressed; a compartment on the inner end of the casing and open at the bottom; and a second platform tiltably supported in the compartment and constituting a closure for the bottom of the compartment, the platforms having interengaging elements whereby when one end of the second platform swings downwardly and when the opposite end of the said platform swings upwardly, the inner end of the first platform will be raised and the outer end of the said platform will be lowered, thereby permitting the door to swing downwardly and inwardly on said platform.

In testimony that I claim the foregoing as my own, I have hereto affixed my signature in the presence of two witnesses.

JOSEPH W. STEVENSON.

Witnesses:
 SIMON GREENEBAUM,
 EVERETT C. CHANEY.